US010072425B1

(12) United States Patent
Madden

(10) Patent No.: US 10,072,425 B1
(45) Date of Patent: Sep. 11, 2018

(54) SPLICE COUPLING FOR CONNECTION OF TUBULAR HANDRAIL SECTIONS

(71) Applicant: Michael Madden, Lake Ozark, MO (US)

(72) Inventor: Michael Madden, Lake Ozark, MO (US)

( * ) Notice: Subject to any disclaimer, the term of this patent is extended or adjusted under 35 U.S.C. 154(b) by 147 days.

(21) Appl. No.: 15/006,678

(22) Filed: Jan. 26, 2016

(51) Int. Cl.
*E04F 11/18* (2006.01)
*F16B 12/40* (2006.01)
*F16B 7/04* (2006.01)

(52) U.S. Cl.
CPC ...... *E04F 11/1808* (2013.01); *E04F 11/1836* (2013.01); *F16B 7/0413* (2013.01); *F16B 2012/403* (2013.01); *Y10T 403/559* (2015.01); *Y10T 403/5786* (2015.01)

(58) Field of Classification Search
CPC ... E04F 11/18; E04F 11/1808; E04F 11/1836; E04F 11/1838; E04F 11/184; E04G 7/20; E04G 11/1838; E04G 11/184; Y10T 403/55; Y10T 403/557; Y10T 403/559; Y10T 403/5786; Y10T 403/7026; Y10T 403/7031; Y10T 403/7035; F16B 7/0413; F16B 7/0446; F16B 2012/403; F16B 7/0406; F16B 7/04
USPC .... 256/65.01, 59, 65.15; 403/292, 297, 298, 403/313, 359.1, 359.3, 359.6
See application file for complete search history.

(56) References Cited

U.S. PATENT DOCUMENTS

| 764,054 | A | | 7/1904 | Houdlette | |
|---|---|---|---|---|---|
| 1,469,304 | A | | 6/1921 | Hughes | |
| 2,997,317 | A | | 8/1961 | Scott | |
| 3,000,656 | A | * | 9/1961 | Hollaender | F16B 7/0413 403/292 |
| 3,932,048 | A | * | 1/1976 | DuPont | F16B 12/40 403/225 |
| 4,344,719 | A | * | 8/1982 | Thom | E04F 11/1817 403/297 |
| 4,714,369 | A | | 12/1987 | Souza, Jr. | |
| 4,809,401 | A | * | 3/1989 | Honig | A47H 1/022 403/297 |
| 5,059,057 | A | * | 10/1991 | Graef | A61F 2/28 403/292 |
| 5,061,000 | A | * | 10/1991 | Haugen | B60P 3/42 285/404 |

(Continued)

*Primary Examiner* — Josh Skroupa
(74) *Attorney, Agent, or Firm* — Mark D. Bowen, Esq.; Malin Haley DiMaggio & Bowen, P.A.

(57) ABSTRACT

An improved handrail splice for use in coupling cylindrical handrail components comprises a generally cylindrical splice having a scalloped outer surface defining a plurality of first and second grooves, with the first grooves being characterized as large grooves circumferentially spaced along the outer surface and a plurality of smaller second grooves disposed between the first grooves. The large grooves are sized to receive and maintain a quantity of adhesive therein to ensure a secure adhesive connection between exterior of the tubular splice and the interior handrail surface. The smaller second grooves receive a smaller quantity of adhesive and further function to anchor the splice relative to the hand rail sections by press-fit engagement. A longitudinal slit bounded by a pair of projecting tabs allows for the temporary reduction of the splice to facilitate inserted installation of the splice within a tubular hand rail component.

3 Claims, 5 Drawing Sheets

(56) References Cited

U.S. PATENT DOCUMENTS

| | | | | |
|---|---|---|---|---|
| 5,200,240 A * | 4/1993 | Baker | ............... | E04F 11/18 |
| | | | | 256/59 |
| 5,261,756 A * | 11/1993 | Kohn | ............... | F16B 7/0413 |
| | | | | 403/292 |
| 5,454,661 A * | 10/1995 | Litvin | ............... | F16B 7/0413 |
| | | | | 403/292 |
| 5,704,728 A * | 1/1998 | Chan | ............... | F21V 21/116 |
| | | | | 403/292 |
| 5,803,647 A | 9/1998 | Hughes | | |
| 5,869,980 A | 4/1999 | Butler | | |
| 6,022,054 A * | 2/2000 | Hemphill | ............... | B29C 65/5042 |
| | | | | 285/398 |
| 6,470,553 B1 * | 10/2002 | Retzbach | ............... | B23P 11/02 |
| | | | | 29/450 |
| 6,568,658 B2 | 5/2003 | Strome | | |
| 6,726,255 B1 | 4/2004 | Ward | | |
| 7,300,059 B2 * | 11/2007 | Caruso | ............... | A63B 63/004 |
| | | | | 273/400 |
| D581,772 S | 12/2008 | Hozen | | |
| 7,618,210 B2 * | 11/2009 | Wagner | ............... | E04F 11/1836 |
| | | | | 403/306 |
| 7,708,317 B2 * | 5/2010 | Leblanc | ............... | F16L 1/10 |
| | | | | 285/31 |
| D626,405 S | 11/2010 | Goad | | |
| 9,239,069 B2 * | 1/2016 | Breyer | ............... | F16B 13/141 |
| D759,887 S * | 6/2016 | Seehof | ............... | D25/41.1 |
| 2002/0164208 A1 * | 11/2002 | Koellner | ............... | A47K 10/04 |
| | | | | 403/378 |
| 2005/0147483 A1 * | 7/2005 | Chen | ............... | F16B 21/082 |
| | | | | 411/338 |
| 2006/0233599 A1 * | 10/2006 | Lah | ............... | E04H 15/60 |
| | | | | 403/292 |
| 2008/0043375 A1 * | 2/2008 | Hanrahan | ............... | F16C 27/00 |
| | | | | 360/265.6 |

* cited by examiner

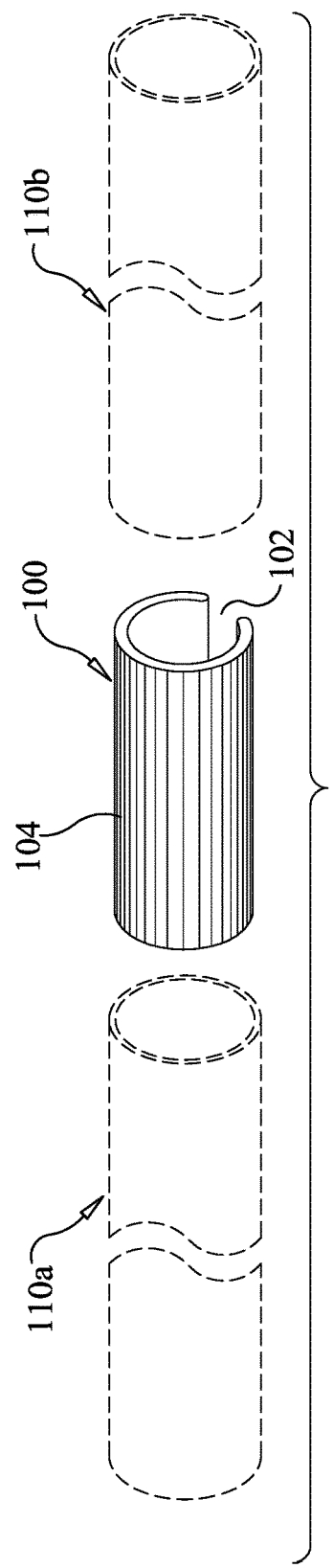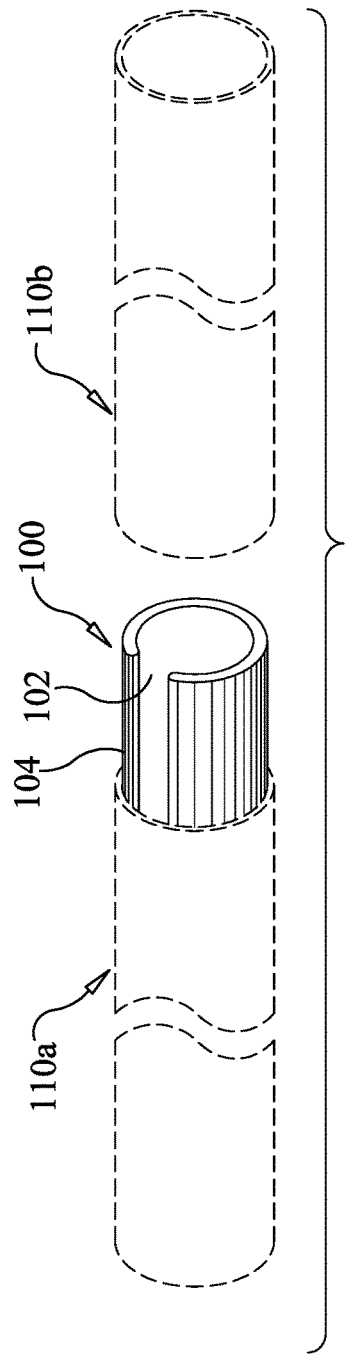

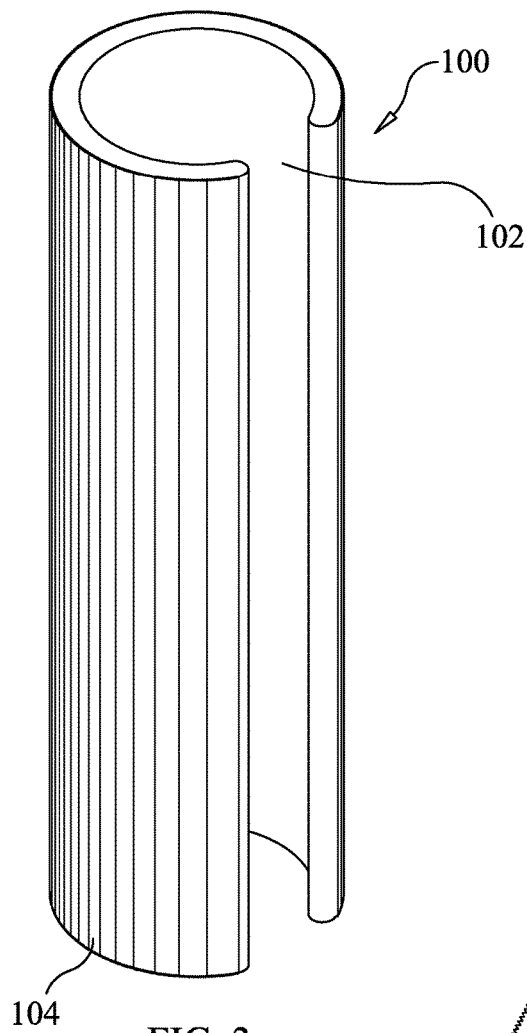
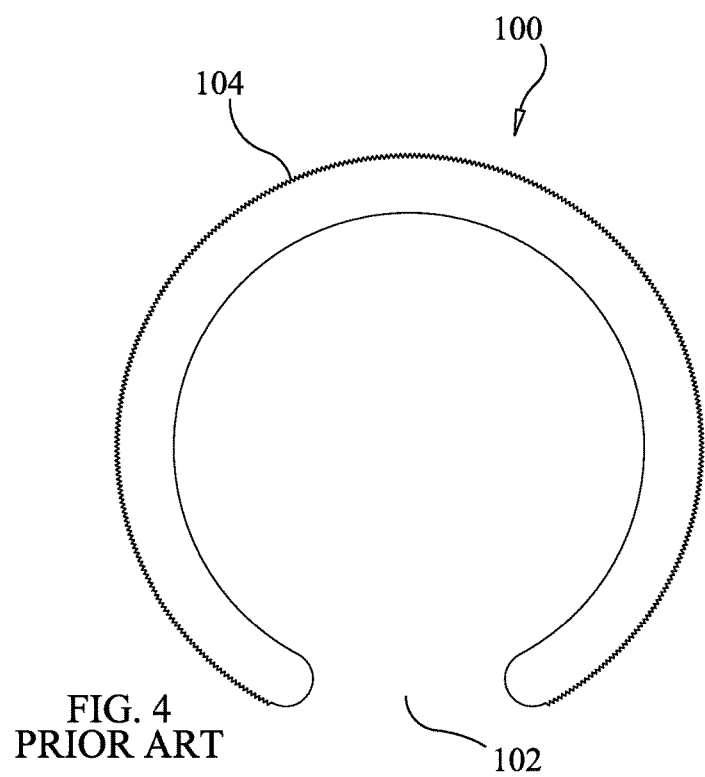
FIG. 3
PRIOR ART
FIG. 4
PRIOR ART

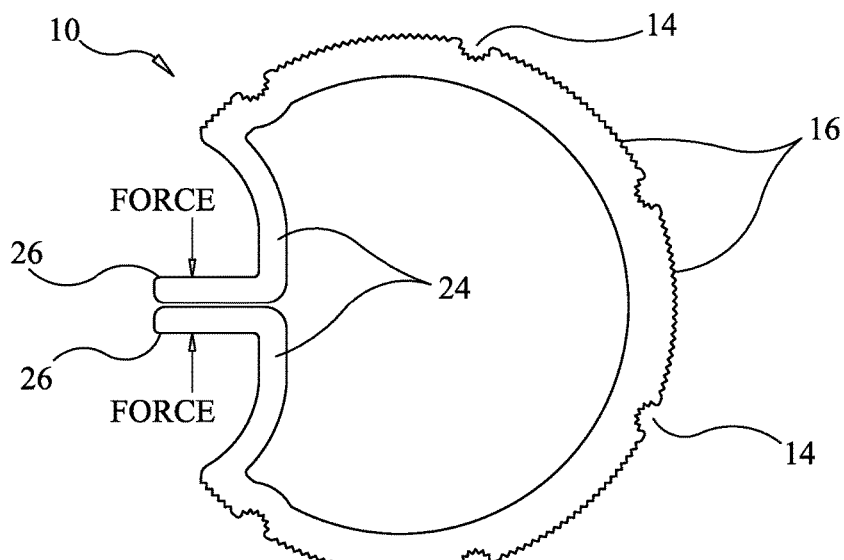
FIG. 6
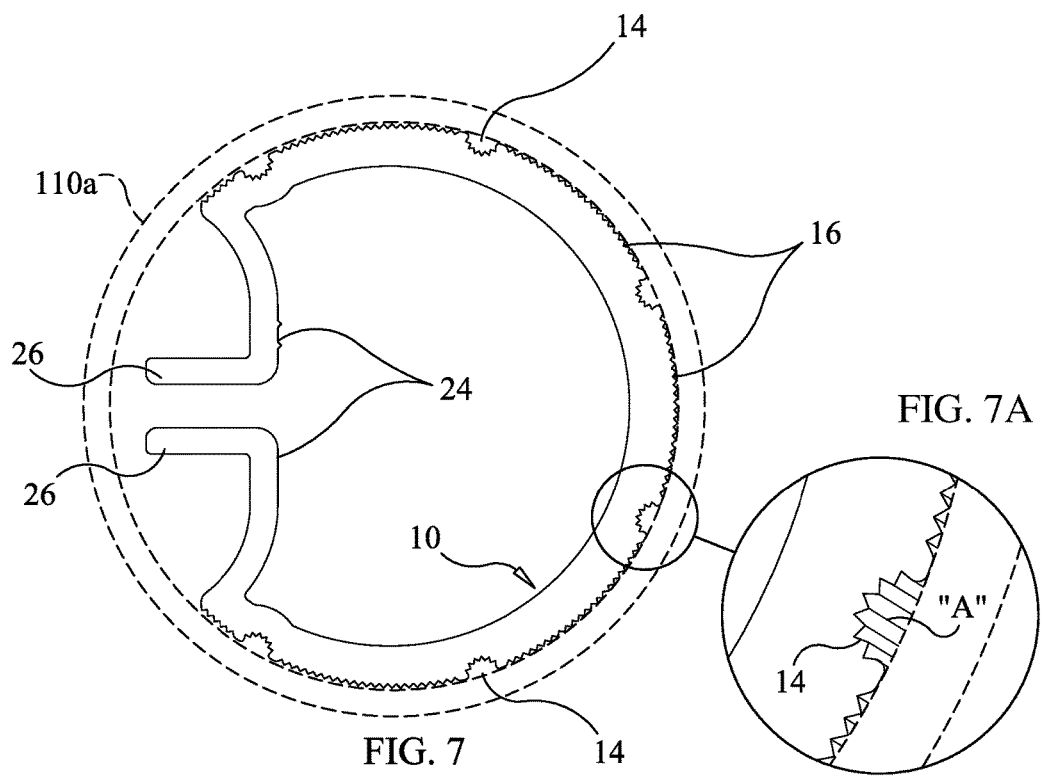
FIG. 7
FIG. 7A

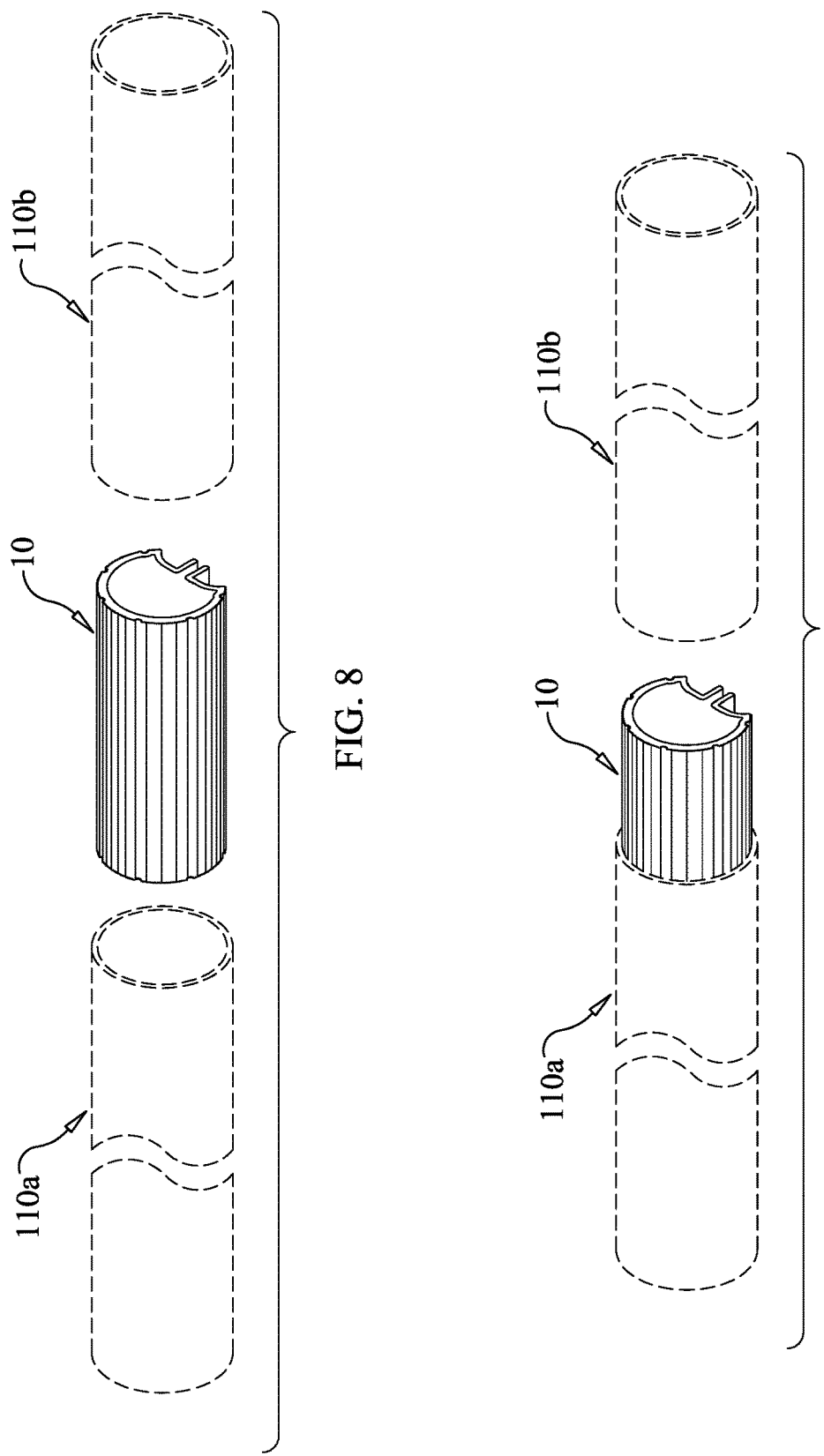

SPLICE COUPLING FOR CONNECTION OF TUBULAR HANDRAIL SECTIONS

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

Field of the Invention

The present invention relates to handrail systems, and more particularly to a splice apparatus for connecting tubular handrail components.

Description of Related Art

Handrail structures installed along stairs and ramps for assisting people while ascending and descending are well known in the art. Handrails are typically installed at a suitable height such that they are readily accessible for use. In addition, laws have more recently been adopted requiring extensive use of handrails in a variety of architectural settings. For example, under Title III of the Americans with Disabilities Act (ADA) all "new construction" (construction, modification or alterations) after the effective date of the ADA (approximately July 1992) must be fully compliant with the Americans With Disabilities Act Accessibility Guidelines (ADAAG) found in the Code of Federal Regulations at 28 C.F.R., § 36. Title III also has application to existing facilities. The ADA effectively requires the removal of non-complaint architectural barriers in existing facilities. Even facilities that have not been modified or altered in any way after the ADA was passed still have obligations regarding ADA compliance. As a result, a vast number of facilities have been required to alter or add ADA compliant handrails.

The background art reveals a number of devices intended to simplify the installation of handrail systems. Among those devices are a variety of tube couplings to facilitate the joining of tubular (typically cylindrical) handrail sections. For example, U.S. Pat. No. 2,997,317, issued to Scott, discloses coupling device for tubular members having an internal wedge means actuated by threaded fasteners. U.S. Pat. No. 4,714,369, issued to Souza, Jr., discloses a rail connector which is urged into engagement with the inner surface of the rail by a wedge. U.S. Pat. No. 6,726,255, issued to Ward, discloses a tube-in-tube joint including a rectangular coupling inserted within adjoining rectangular tubes. The above-referenced devices all rely on mechanical fasteners and wedge-type technology. Mechanical fastening is burdened by several disadvantages, namely, the potential for threaded fasteners to loosen over time as well as the requirement for excessive parts.

Finally, FIGS. 1-4 depict a known prior art tubular splice device, generally referenced as 100, which is used to secure the ends of adjoined rail sections, referenced as 102a and 102b respectively. The prior art splice device 100 comprises a semi-cylindrical C-shaped body defining a longitudinal slit 102, and having an outer surface defining a plurality of fine longitudinal grooves 104 running the full length of splice device 100. The device must be forced into a compressed stated upon insertion and is secured using adhesive. That device, however, is difficult to compress thereby rendering installation difficult, and is further known to exhibit poor adhesion due to the use of the extremely fine groove configuration which fails to provide sufficient groove area for retaining a meaningful quantity of adhesive.

In view of the above, there remains a need in the art for advancements in the field of handrail coupling devices and systems.

BRIEF SUMMARY OF THE INVENTION

The present invention overcomes the limitations and disadvantages present in the art by providing an improved handrail splice or coupling for use in joining cylindrical handrail components. A splice apparatus in accordance with the present invention comprises a generally cylindrical splice having a scalloped outer surface defining a plurality of first and second grooves, with the first grooves being characterized as large grooves circumferentially spaced along the outer surface with a plurality of smaller second grooves disposed between the large grooves. The large grooves are sized to receive and maintain a quantity of adhesive therein to ensure an adhesive connection between exterior of the tubular splice and the interior handrail surface. The smaller second grooves receive a smaller quantity of adhesive and further function to anchor the splice relative to the hand rail sections by press-fit engagement. The splice is further characterized as a split body defining a longitudinal slit bounded by a pair of inwardly projecting legs terminating in projecting tabs. The tabs provide compressive bearing surfaces for application of a compressive force which may be applied by a pliers-type hand tool to temporarily reduce the diameter of the splice to facilitate inserted installation of the splice within a tubular hand rail component. Once inserted, the compressive force is released and the splice assumes its normal shape whereby final adjustment of the opposing tube sections may be achieved.

Accordingly, it is an object of the present invention to provide advancements in the field of handrail construction.

Another object of the present invention is to provide a handrail splice that forms a secure connection and is easy to install.

Yet another object of the present invention is to provide a handrail splice adapted with tabs that temporarily reduce the diameter of the slice for ease of installation in response to compression applied by a simple hand tool.

Still another object of the present invention is to provide a handrail splice having an outer surface adapted with In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 1 depicts a prior art handrail splice in exploded relation with hand rail members;

FIG. 2 depicts the prior art handrail splice partially inserted within one of the hand rail members;

FIG. 3 is a perspective view of the prior art handrail splice;

FIG. 4 is an end view thereof;

FIG. 6 is an end view thereof;

FIG. 7 is an end view of the hand rail splice shown in operative engagement with a handrail depicted in phantom view;

FIG. 7A is a detailed view of the circled portion of FIG. 7;

FIG. 8 depicts a handrail splice in accordance with the present invention in exploded relation with hand rail members; and FIG. 9 depicts the handrail splice partially inserted within one of the handrail members.

DETAILED DESCRIPTION OF THE INVENTION

Figure 5:
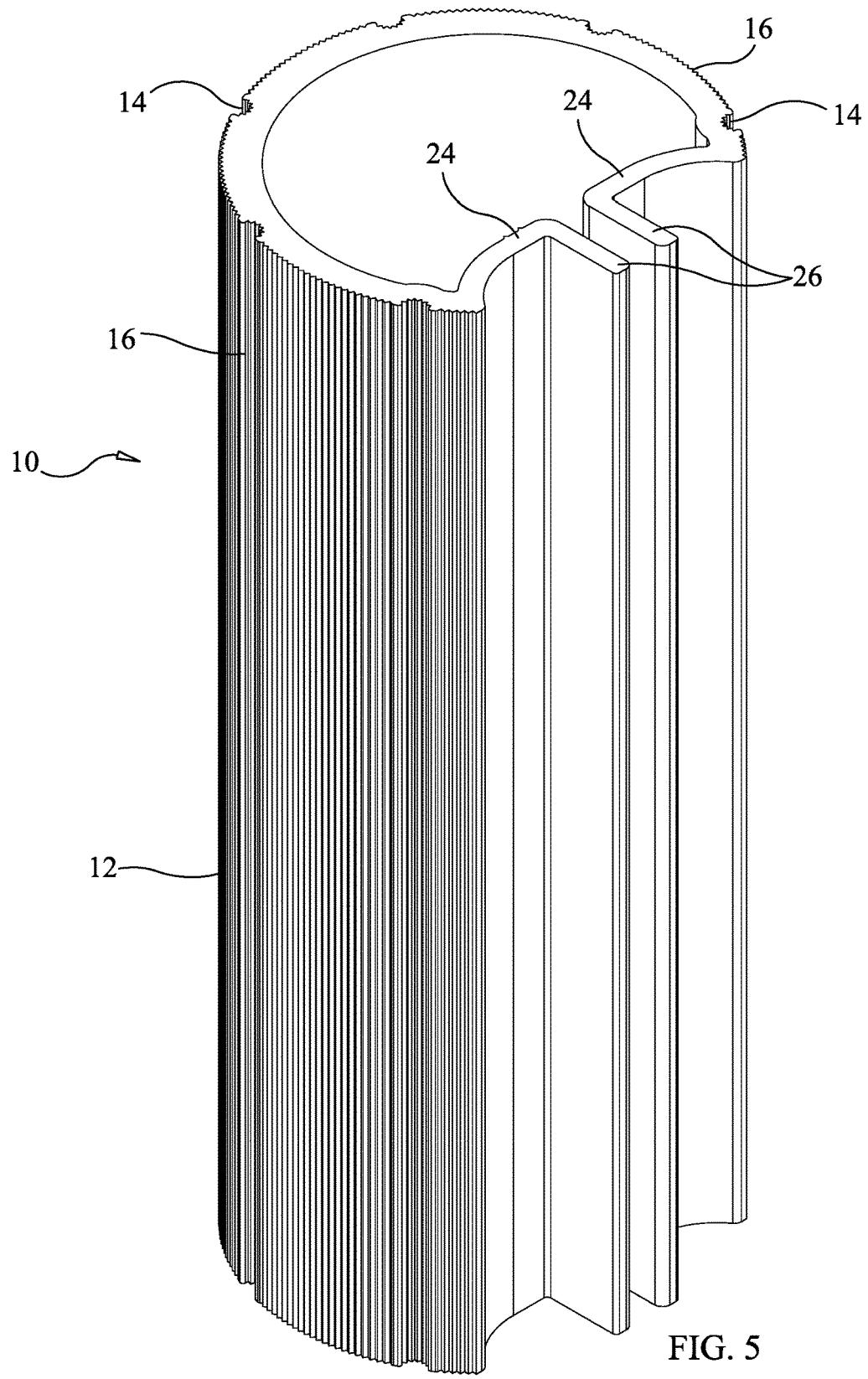
FIG. 5 is a perspective view of a handrail splice in accordance with the present invention.

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. As used herein the term "splice" and "coupling" shall be considered synonyms to describe a device for joining and maintaining handrail sections in abutting engagement to form handrail system.

Turning now to the drawings, FIGS. 5-9 illustrate a handrail splice, generally referenced as 10, in accordance with the present invention. Handrail splice 10 comprises a generally cylindrical splice body having cylindrical portion and a non-cylindrical segment portion. The cylindrical portion includes a scalloped outer surface, generally referenced as 12. Outer surface 12 defines a plurality of first and second longitudinally running grooves, referenced as 14 and 16 respectively. The plurality of first grooves 14 are characterized as being large semi-circular grooves and are circumferentially spaced along the outer surface 12 of splice 10. The plurality of second grooves 16 disposed on surface 10 are characterized as being small (in comparison to grooves 14) and V-shaped. As best seen in FIGS. 5 and 6, first grooves 14 preferably have a concave surface that further defines a plurality of small V-shaped grooves 16, in a groves-within-a-groove configuration. Handrail splice 10 is preferably fabricated from extruded 6063-T5 aluminum. A 6063 aluminum is an aluminum alloy, with magnesium and silicon as the alloying elements. The alloy is preferably tempered to a T5 rating such that the material has a tensile strength of at least 20,000 psi.

A significant aspect of the present invention involves providing splice 10 with a plurality of large first grooves 14 which are important in improving adhesion with the handrail components. More particularly, first grooves 14 provide increased concave volume for receiving a larger quantity of adhesive as compared with the prior art splice depicted in FIGS. 1-4. The larger concave dimension of grooves 14 has been found to prevent the adhesive from oozing from the grooves as the splice is inserted within the handrail section. FIG. 7 includes a partial magnified view wherein adhesive, referenced as "A," is shown within one of the first grooves 14. The smaller second grooves 16 naturally receive a smaller quantity of adhesive and further function to anchor the splice relative to the hand rail sections.

A second significant aspect of the present invention relates to another unique aspect of splice 10. In accordance with this aspect, splice 10 is further characterized as having a non-cylindrical segment portion, generally referenced as 20, defining a longitudinal slit 22. Slit 22 is bounded by a pair of inwardly projecting legs each referenced as 24 terminating in projecting tabs 26. Slit 22 functions to allow the diameter of the splice to be temporarily reduced, by application of a compressive force, thereby allowing the splice to be easily inserted into the end of a tubular handrail section. Legs 24 and tabs 26 are structure to facilitate temporary diameter reduction by application of a compressive force. More particularly, tabs 26 are disposed in spaced parallel relation to provide compressive bearing structures or surfaces for application of a compressive force. The compressive force may be applied by any suitable force applying means, and is preferably applied by the installing technician using a pliers-type hand tool to temporarily reduce the diameter of the splice to facilitate inserted installation of the splice within a tubular hand rail component. Once inserted, the compressive force is released and the splice assumes its noirial shape whereby final adjustment of the opposing tube sections may be achieved. FIG. 6 illustrates the reduction the spacing between tabs 26 in response to application of a compressive force.

FIGS. 8 and 9 depict handrail splice 10 in relation to handrail sections, referenced 110a and 110b to be joined. Prior to installation, a suitable adhesive is applied either to the inner surface of handrail sections 110a and 110b, or to the external surface of splice 10, or to both the handrail sections and splice 10. Next a compressive force is applied to tabs 26 using pliers or other suitable implement, so as to move tabs 26 closer together as illustrated in FIG. 6 thereby temporarily reducing the size of splice 10 to allow for insertion thereof within one or both handrail sections 110a and 110b. Upon removal of the compressive force, splice 10 expands within the handrail sections, which are, in a final step, manually urged into abutting engagement. The additional adhesive maintained within grooves 14 functions to achieve a stronger joint coupling as compared with the prior art splice illustrated in FIGS. 1 and 2. As should be apparent, the present invention overcomes the limitations and disadvantages present in the art by providing an improved splice apparatus for use in joining cylindrical hand rail components.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A handrail splice joining first and second handrail sections, said handrail splice comprising:
    a splice body having a generally cylindrical outer surface portion and a non-cylindrical segment portion;
    said non-cylindrical segment portion including a pair of opposing inwardly projecting legs, each of said legs terminating in an outwardly projecting tab; and
    said tabs having outer surfaces disposed in spaced parallel relation, whereby application of a compressive force upon said tabs reduces the spacing between said tabs thereby reducing the diameter of said splice body to allow for insertion thereof within the handrail sections.

2. The handrail splice according to claim 1 wherein said generally cylindrical outer surface portion defines:
    a plurality of first longitudinal grooves and a plurality of second longitudinal grooves;
    said first longitudinal grooves including a plurality of circumferentially spaced grooves; and
    said second longitudinal grooves including a plurality grooves disposed between each of said first longitudinal grooves.

3. A handrail splice joining first and second handrail sections, said handrail splice comprising:
    a splice body having a generally cylindrical outer surface portion and a non-cylindrical segment portion;
    said generally grooved cylindrical outer surface portion including a plurality of first longitudinal grooves and a plurality of second longitudinal grooves;
    said first longitudinal grooves including a plurality of circumferentially spaced grooves;
    said second longitudinal grooves including a plurality grooves disposed between each of said first longitudinal grooves;
    said first longitudinal grooves each defining a first groove volume and said second longitudinal grooves each defining a second groove volume, wherein said first groove volume is larger than said second groove volume; and
    said non-cylindrical segment portion including a pair of opposing inwardly projecting legs, each of said legs terminating in an outwardly projecting tab;
    said tabs having force bearing surfaces disposed in spaced parallel relation, whereby application of a compressive force upon said tabs reduces the spacing between said tabs thereby reducing the diameter of said splice body to allow for insertion thereof within the handrail sections;
    said splice body expanding upon release of the compressive force and without additional hardware such that said grooved cylindrical outer surface contacts the inner surface of handrail sections disposed in surrounding relation therewith.

* * * * *